UNITED STATES PATENT OFFICE.

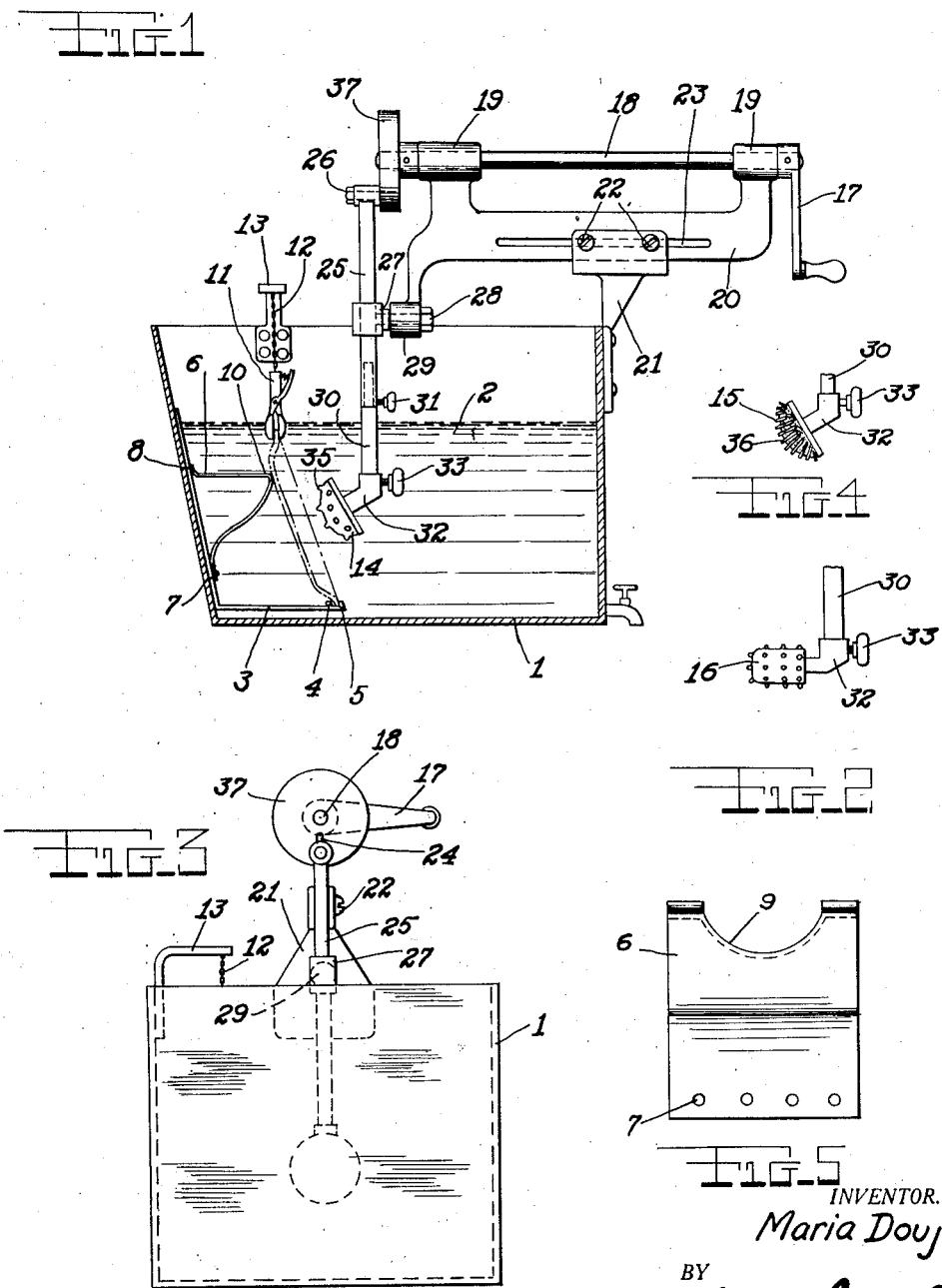

MARIA DOUJAK, OF NEW YORK, N. Y.

DISH-WASHING MACHINE.

1,356,911.  Specification of Letters Patent.  Patented Oct. 26, 1920.

Application filed January 13, 1920. Serial No. 351,120.

*To all whom it may concern:*

Be it known that I, MARIA DOUJAK, citizen of Austria, and resident of New York, in the county of New York and State of New York, have invented certain new and useful Improvements in Dish-Washing Machines, of which the following is a specification.

This invention relates to dish washing machines, and particularly to that type which is manually operated.

The object of this invention is to provide a sanitary mechanism characterized by ease in operation which is capable of washing cooking and eating utensils thoroughly without the necessity of wetting the hands.

The above and other objects are attained by an arrangement and combination of devices as hereinafter described, reference being had to the accompanying drawings in which, Figure 1 is an elevation and partial section of my invention.

Fig. 2 is an elevation of a cleansing attachment for use in washing cups or glasses.

Fig. 3 is an end elevation of my invention.

Fig. 4 is an elevation of a modified form of the cleansing attachment.

Fig. 5 is a side elevation of the bracket used for yieldingly supporting the utensil to be washed.

In the preferred form of my invention, a receptacle 1 is provided for holding a cleansing fluid, which may be water of any desired temperature or a soapy solution. A utensil holder 3, bent to conform to the shape of receptacle 1 is provided with upward projections 4 and 5 near the horizontal edge thereof, for holding the edge of the utensil between said projections, (Fig. 1). A spring bracket 6 is fastened to holder 3 by rivets 7 at the lower end thereof, the upper end 8 being free to move along said holder.

A portion of said bracket 6 is cut away at 9 to allow any large round utensil to be suitably supported by said bracket at 9. Pressure on the corner 10 of bracket 6 will cause the free end 8 to move upwardly along holder 3 whereby excessive pressure on any fragile utensil held between said bracket 6 and the projections 4 and 5 will be diminished and the danger of breaking the utensil obviated. A hand clamp 11 held by chain 12 to bracket 13 on receptacle 1 is used for grasping the utensil and manipulating it into the proper position for washing.

The mechanism for operating the various cleaning attachments as 14, 15, and 16, comprises the crank 17, mounted on shaft 18, which is held in bearing 19 of frame 20, and the other parts operatively connected thereto. Said frame 20 is adjustably supported from receptacle 1 by bracket 21, screw bolts 22 in said bracket 21 being arranged to engage slot 23 of frame 20 for allowing said frame and the mechanism attached thereto to be moved longitudinally.

Crank disk 37 is mounted on the end of shaft 18 and has a radial slot 24 therein. Connecting rod 25 is adjustably secured at one end in said slot 24 by means of a suitable fastening as bolt 26, and passes through bearing 27 which is pivoted by means of bolt 28 about bearing 29 of frame 20. Said connecting rod 25 is made hollow at its lower end to receive adjusting arm 30 which is held to rod 25 by clamp screw 31. Elbow 32 is adapted to fit over the lower end of arm 30 and is held thereto by clamp screw 33. Swabbing or cleansing attachment 14 is made preferably of soft rubber and has solid projections 35 thereon for better removal of the waste matter from the utensil. Attachment 15 is shown made of cloth or other suitable material, and has strips 36 projecting therefrom. It is obvious, however, that attachments of any suitable material such as steel wool for removing hardened matter, or soft fabric for cleaning glasses, may be used, without departing from the scope of my invention, and that said attachments may be made of various shapes for cleaning differently shaped articles.

By turning crank 17, connecting rod 25 is reciprocated through bearing 27, which is at the same time oscillated, whereby elbow 32 and the device at the end thereof, is given a circular motion. Adjustment to the size and position assumed by the utensil to be cleaned may be had by moving frame 20 longitudinally, positioning the upper end of rod 25 at the desired point in slot 24, and moving arm 30 in or out of rod 25 before clamping.

What I claim is:

1. In a device of the character described, a yieldable utensil supporting bracket, and adjustable means adapted to move over the surface of said utensil for cleaning said utensil comprising an adjustable connecting rod, a pivoted bearing slidably supporting said rod near the middle thereof, means for giving the upper end of said rod a circular motion; and a swab carried by the lower end of said rod.

2. In a device of the character described, means for supporting a utensil, a cleaning swab, means for operating said swab comprising a connecting rod carrying said swab, a pivoted bearing slidably supporting said rod, and means for giving the upper end of said rod an orbital motion, and means for manually manipulating said utensil.

3. In a device of the character described, a liquid holding receptacle, means mounted on said receptacle for washing a utensil, and means for supporting said utensil, attached to said receptacle, comprising a horizontal plate supported from the side of said receptacle, upward projections at the edge of said plate for holding a utensil therebetween, and a yieldable bracket attached at its lower end to said plate, the upper end being free to move along the side of said receptacle when pressure is put on said utensil.

4. In a device of the character described, a liquid holding receptacle, means for holding a utensil in said receptacle, and means for cleaning said utensil comprising a shaft supported by said receptacle, a slotted crank on the end of said shaft, a connecting rod adjustably mounted on said crank, a pivoted bearing slidably supporting said rod near the middle thereof, an elbow adjustably mounted on said connecting rod, and a swab carried by said elbow.

5. In a device of the character described, a connecting rod adjustable in length, an elbow mounted on the lower end of said rod, a swab carried by said elbow, means for giving the upper end of said rod a circular motion, a pivoted bearing slidably supporting said rod near the middle thereof, and a yielding bracket for supporting the utensil to be washed.

Signed at New York in the county of New York and State of New York this 5th day of January, A. D. 1920.

MARIA DOUJAK.